Patented Aug. 7, 1951

2,563,325

UNITED STATES PATENT OFFICE 2,563,325

ACETALS OF PROPARGYL ALCOHOL

Frederick Fahnoe, Easton, Pa., assignor to General Aniline & Film Corporation, New York, N. Y., a corporation of Delaware No Drawing. Application December 16, 1948, Serial No. 65,713

8 Claims. (Cl. 260—345)

This invention relates to new compounds and the process for preparing them.

These new compositions have the following general formula:

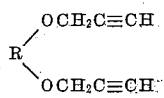

wherein R is an aldehyde functional group including aliphatic, aromatic and heterocyclic aldehydes.

The process for preparing these compounds comprises generally refluxing propargyl alcohol with the desired aldehyde. In the case of formaldehyde, the reaction may be represented as follows:

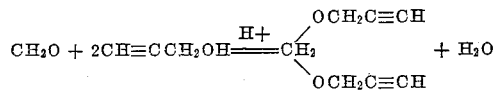

The following example illustrates the preparation of some of the compounds falling within the scope of this invention, but it will be understood that the invention is not limited thereto.

Example

A mixture of pure propargyl alcohol with an excess above a stoichiometric amount of a 30% aqueous formaldehyde solution is refluxed for a few minutes and then distilled. The pot residue was dipropargyl formal and the yield was about 20% of the original propargyl alcohol. Dipropargyl formal has the following formula:

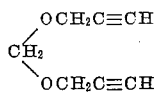

and this is borne out by the following analytical data:

|  | Observed | Theory |
| --- | --- | --- |
| C as dipropargyl formal | 67.76% | 67.77% |
| H as dipropargyl formal | 6.81 | 6.45 |
| Unsaturation (Moles/moles formal) | 4.02 | 4.00 |
| Acetylenic hydrogen per mol formal | 1.90 | 2.00 |
| Refractive index at 25° C | 1.4430 | |
| B. P. at 760 mm. Hg °C | 174 | |

The product hydrolyzes extremely slowly in acid solution, which is unlike most acetals. It is water white.

In general, these acetal derivatives of propargyl alcohol may be formed with any aldehyde such as, for example, aliphatic aldehydes (acetaldehyde, propionaldehyde, butyraldehyde), aromatic aldehydes (benzaldehyde, cinnamonaldehyde, vanillin, naphthaldehyde, methoxybenzaldehyde), heterocyclic aldehydes (furfural).

Examples of other compounds which may be formed from these aldehydes include, for example, dipropargyl benzal, which has the following formula:

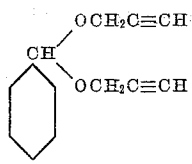

and dipropargyl furfural, which has the following formula:

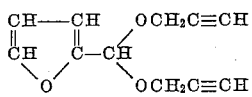

In general, strong mineral acids such as sulphuric and hydrochloric will aid in catalyzing the reaction and they may be added in small quantities to the reacting materials. Furthermore, the reaction may be carried out in the presence of large quantities of water.

As will be obvious from their structure, the compounds are useful as intermediates in preparing polymers thereof as well as substitution products by reason of the high reactivity of the triple bond.

I claim:

1. A new composition of matter comprising a compound having the following formula:

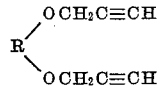

wherein R is a halogen-free residue of an aldehyde.

2. A new composition of matter comprising a compound having the following formula:

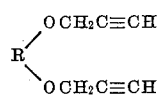

wherein R is a halogen-free residue of an aromatic aldehyde.

3. A new composition of matter comprising a compound having the following formula:

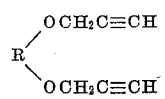

wherein R is a halogen-free residue of an aliphatic aldehyde.

4. A new composition of matter comprising a compound having the following formula:

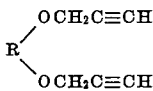

wherein R is a halogen-free residue of a heterocyclic aldehyde.

5. A new composition of matter comprising a dipropargyl formal of the following formula:

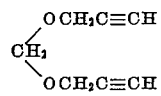

6. A new composition of matter comprising a compound having the formula:

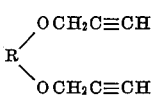

wherein R is a residue of an unsubstituted aldehyde selected from the group consisting of acetaldehyde, propionaldehyde, butyraldehyde, benzaldehyde, cinnamonaldehyde, vanillianaldehyde, naphthaldehyde, methoxybenzaldehyde and furfural.

7. A new composition of matter comprising a compound having the following formula:

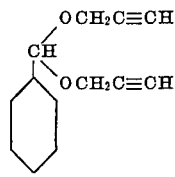

8. A new composition of matter comprising a compound having the following formula:

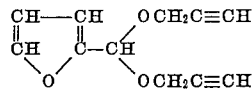

FREDERICK FAHNOE.

REFERENCES CITED

The following references are of record in the file of this patent:

UNITED STATES PATENTS

| Number | Name | Date |
| --- | --- | --- |
| 2,411,826 | Filachione | Nov. 26, 1946 |

OTHER REFERENCES

Sabatier: Catalysis in Organic Chemistry (1922), pages 779-783.

Adams et al.: J. A. C. S. 47, 1358-67 (1925).